United States Patent
Bandic et al.

(10) Patent No.: US 7,111,381 B2
(45) Date of Patent: Sep. 26, 2006

(54) METHOD OF MAKING A HARD DISK DRIVE MORE VISUALLY STIMULATING

(75) Inventors: Zvonimir Z. Bandic, San Jose, CA (US); Thomas Robert Berthold, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 478 days.

(21) Appl. No.: 10/668,707

(22) Filed: Sep. 23, 2003

(65) Prior Publication Data

US 2005/0076493 A1    Apr. 14, 2005

(51) Int. Cl.
*G11B 5/127* (2006.01)
*G11B 33/14* (2006.01)

(52) U.S. Cl. ............... 29/603.03; 29/603.01; 29/603.09; 360/97.02

(58) Field of Classification Search ............ 29/603.03, 29/603.01, 603.09; 360/133, 129, 266.4, 360/251.5, 291, 97.02, 97.03; 361/679, 680, 361/683
See application file for complete search history.

(56) References Cited

U.S. PATENT DOCUMENTS

| | | | | |
|---|---|---|---|---|
| 3,557,360 A | * | 1/1971 | Aldridge ................... 362/558 | |
| 4,280,155 A | | 7/1981 | Scott et al. | |
| 5,105,414 A | * | 4/1992 | Funabashi et al. .......... 720/613 |
| 5,349,575 A | * | 9/1994 | Park ............................ 369/1 |
| 5,396,340 A | * | 3/1995 | Ishii et al. .................. 386/106 |
| 5,724,224 A | * | 3/1998 | Howell et al. .............. 361/680 |
| 5,924,782 A | * | 7/1999 | Park .......................... 312/328 |
| 6,040,822 A | * | 3/2000 | Decker ....................... 345/168 |
| 6,663,454 B1 | | 12/2003 | Russ et al. | |
| 6,714,379 B1 | | 3/2004 | Thompson et al. | |
| 6,888,322 B1 | | 5/2005 | Dowling et al. | |
| 6,891,721 B1 | | 5/2005 | Huang | |
| 2002/0044376 A1 | | 4/2002 | Serizawa et al. | |
| 2002/0186529 A1 | | 12/2002 | Huang | |
| 2004/0052042 A1 | | 3/2004 | Shih-Tsung | |
| 2005/0063090 A1 | | 3/2005 | Bandic et al. | |

FOREIGN PATENT DOCUMENTS

| | | |
|---|---|---|
| JP | 11159226 A | 6/1999 |
| JP | 02001210005 A | 8/2001 |
| WO | WP9857328 A1 | 12/1998 |
| WO | WO 02/32999 A2 | 4/2002 |

* cited by examiner

*Primary Examiner*—A. Dexter Tugbang
*Assistant Examiner*—Tai Nguyen
(74) *Attorney, Agent, or Firm*—Bracewell & Giuliani LLP (57) ABSTRACT

A method of configuring a hard disk drive with a transparent cover allows the elements of the disk drive to be observed while they are in operation. The cover also can be tinted with different colors or made somewhat translucent for further differentiation. In addition, decorations and/or various patterns, such as a diffraction grating pattern, may be placed or formed on the cover, the hub, and/or the actuator to further emphasize particular aspects of the disk drive. A flashing device can also be used to accentuate the rotational motion of the disk and/or hub.

18 Claims, 5 Drawing Sheets

METHOD OF MAKING A HARD DISK DRIVE MORE VISUALLY STIMULATING

BACKGROUND OF THE INVENTION

1. Technical Field

The present invention relates in general to an improved method of configuring a hard disk drive and, in particular, to an improved method of configuring a hard disk drive with a transparent cover, flashing device, and specially decorated top plate or hub for storage applications with a visually observable disk drive.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked on a common spindle that is turned by a disk drive motor at several thousand revolutions per minute (rpm). Hard disk drives have several different typical standard sizes or formats, including server, desktop, mobile (2.5 and 1.8 inches) and microdrive.

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The surface of the slider facing the disk is aerodynamically shaped to create an air bearing in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a substantially constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops a torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

Hard disk drives are virtually anonymous among mass consumers of computers, pocket computers, mobile phones, MP3 players and devices that involve storage devices. For example, users of digital cameras, MP3 players, etc., are typically unaware of the distinction between flash memory and the Microdrive™. One potential source of this confusion may be that some memory devices are misleadingly described as "disk drive like" (e.g., the SanDisk, which is actually flash memory). Consumers have been impressed and fascinated when they learn that the memory device that looks just like flash memory is in fact a disk drive that works just like the one in their personal computer.

Unfortunately, disk drives are located inside the machines in which they operate and they are sealed inside completely opaque housings. Thus, consumers are unable to appreciate the mechanical and electrical engineering of the operation of disk drives. It would be advantageous to somehow overcome the limitations of displaying disk drives while they are in operation in order to distinguish those machines that utilize disk drives instead of flash memory. Such a solution would provide an interesting, attractive, and distinctive product in the marketplace.

SUMMARY OF THE INVENTION

One embodiment of a method of configuring a hard disk drive with a transparent or partially transparent top cover is disclosed. When the disk drive is operating as a storage device for a machine, the inner workings of the disk drive are visible from an exterior of the disk drive. Using a partial transparent cover is a convenient way to solve mechanical problems that may result from elastic properties of completely transparent materials. The cover also can be tinted with different colors or made somewhat translucent for further differentiation. In addition, various patterns, such as a diffraction grating pattern, may be placed or formed on the cover to further emphasize particular aspects of the transparent cover disk drive.

The disks in the disk drive spin at high rates of speed, which are typically on the order of 4,200 to 15,000 rpm, depending on the product class. Such speeds are visually unobservable to the unassisted human eye. However, when the disk drive or the machine using the disk drive is equipped with a flashing device (e.g., a stroboscope), the rotational motion of the disk is virtually "captured," which is apparent at the top hub holding the disk stack. The flashing device exposes the series of the positions of the hub, corresponding to the much smaller apparent rotational velocity. In particular, if the frequency of the flashing device is properly adjusted, it will appear to the human eye that the rotational velocity of the disk is much lower. For example, if the disks are spinning at 7,200 rpm, the flashing device operating at 119 Hz makes the disk appear to be spinning at only one rotation per second, which is easily observable by the unassisted human eye.

When the flashing device is turned off or not desirable to enhance the motion and/or appearance of the disk drive, alternative decorations on either the hub, the top disk in the disk stack, or both offer additional visual interest. The decorations may comprise different materials such as diffraction grating or other devices. In conjunction with rotation of the disk, the decorations cause appearance of color, and change and movement of color depending on the angle of observation, which additionally contributes to the appearance of the disk drive. As an additional alternative, the actuator arm in the disk drive may be decorated with the same device to emphasize its movement. Furthermore, diffraction grating may be placed or etched into the transparent cover above the actuator arm, which displays colors when the highly reflective actuator arm is moving. In addition, the top hub, top disk surface, and top surface of the actuator arm may be used for marketing purposes, such as advertisement placements, with or without flashing device help.

The disk drive of the present invention is mounted to a machine so that it is easily observable by the user of the machine. Examples of possible implementations include desktop computers of retrograde-looking designs with front-mounted disk drives that are reminiscent of old mainframe computers (analogous as the "PT Cruiser" of desktop computers), MP3 players with a disk drive that is observable from one side of the player, pocket PC with a partially exposed 1-inch disk drive, etc.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
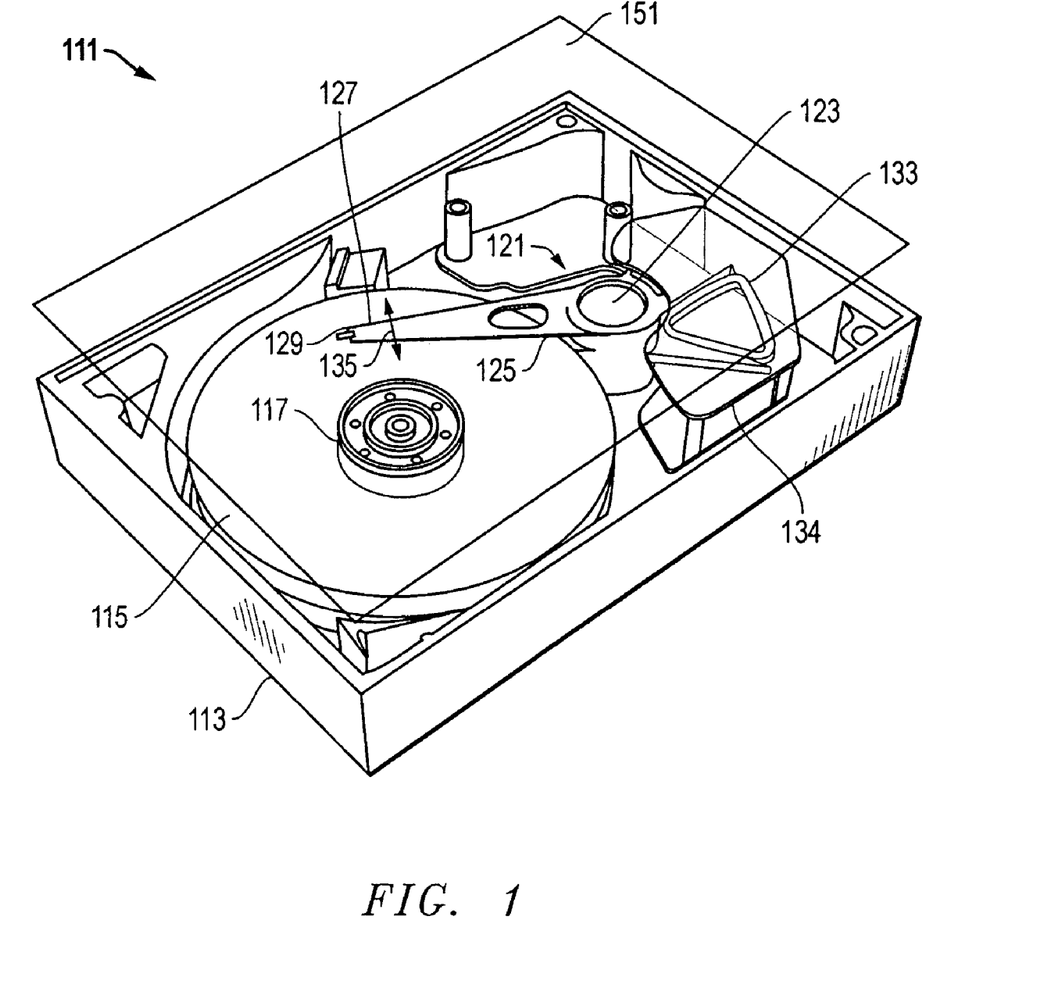
FIG. 1 is an isometric view of one embodiment of a hard disk drive shown with the cover exploded and is constructed in accordance with the present invention.

Referring to FIG. 1, a schematic drawing of one embodiment of an information storage system comprising a magnetic hard disk file or drive 111 for a computer system is shown. Hard disk drive 111 has an outer housing or base 113 containing a disk pack having at least one media or magnetic disk 115. The disks 115 are rotated by a spindle motor assembly having a central drive hub 117. An actuator 121 comprises a plurality of parallel actuator arms 125 (one shown) in the form of a comb that is movably or pivotally mounted to base 113 about a pivot assembly 123. A controller is also mounted to base 113 for selectively moving the comb of arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be of "femto" size (approximately 850×700×230 microns) and is preloaded against the surface of disks 115 (in the range two to ten grams) by suspension 127.

Suspensions 127 have a spring-like quality, which biases or urges the air bearing surface of the slider 129 against the disks 115 to cause the slider 129 to fly at a precise distance from the disks 115. A voice coil 133 free to move within a conventional voice coil motor magnet assembly 134 is also mounted to arms 125 opposite the head gimbal assemblies. Movement of the actuator 121 (indicated by arrow 135) by the controller moves the head gimbal assemblies along radial arcs across tracks on the disks 115 until the heads settle on their respective target tracks. The head gimbal assemblies operate in a conventional manner and always move in unison with one another, unless the hard disk drive 111 uses multiple independent actuators (not shown) wherein the arms can move independently of one another.

Referring again to FIG. 1, one embodiment of the present invention comprises the hard disk drive 111 configured with a transparent cover 151. The cover 151 is mounted to the housing 113 for covering and preferably sealing the disks 115 and the actuator 121 in the housing 113. The cover 151 allows or permits observation of at least some movement inside the housing 113 through the cover 151 during operation of the hard disk drive 111. In the version shown, the cover 151 permits observation of at least the top disk 115, the hub 117, and the actuator 121. Such observation is visible to the unassisted human eye and does not require any special equipment for perceiving the movement inside the hard disk drive 111. Alternatively, the cover 151 may be completely transparent and clear, tinted with a color or colors, and/or may be provided as translucent rather than transparent.

Figure 2:
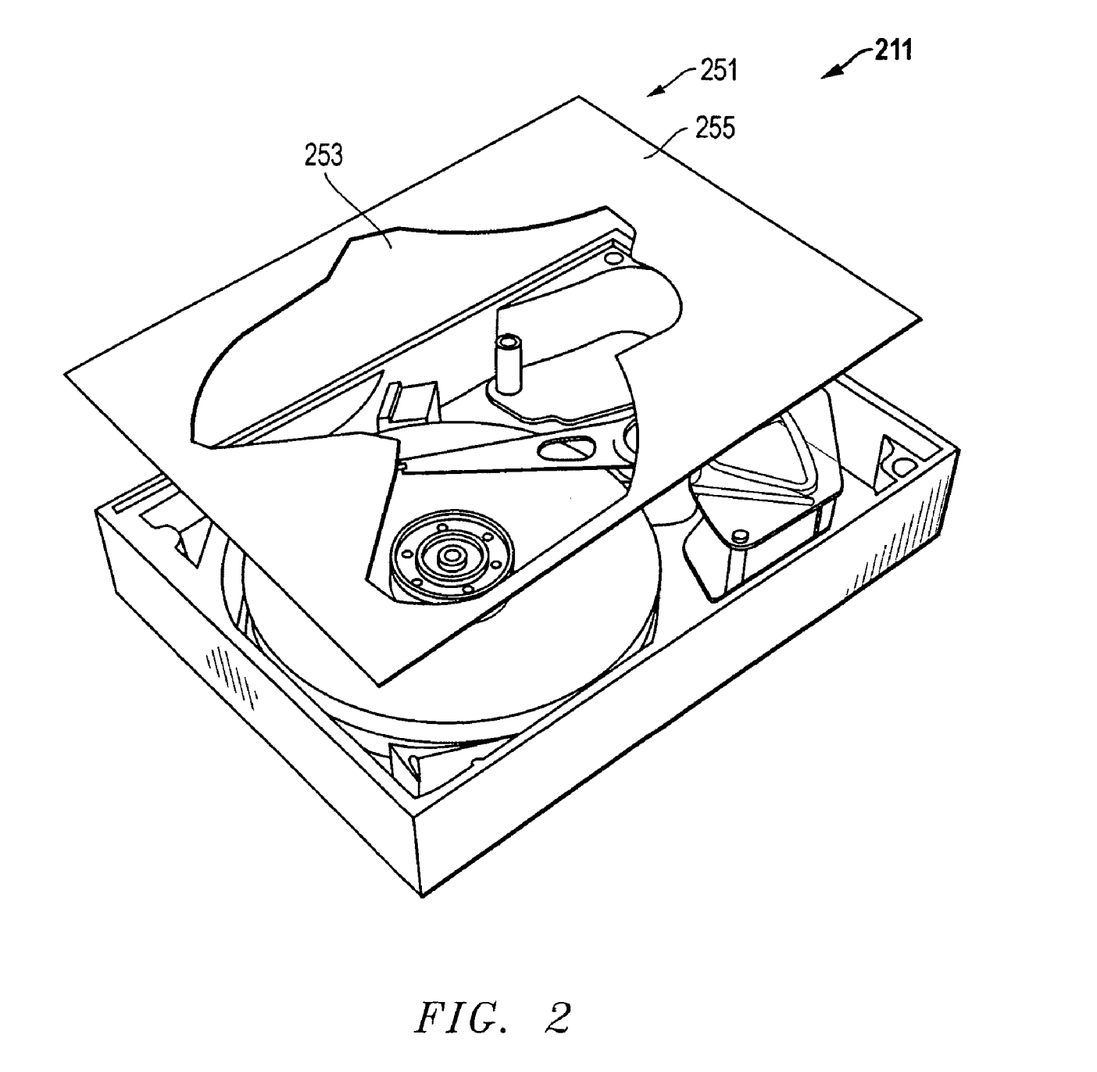
FIG. 2 is an isometric view of another embodiment of a hard disk drive shown with the cover exploded and is constructed in accordance with the present invention.

A second embodiment of the present invention is shown in FIG. 2. In this embodiment, a hard disk drive 211 is equipped with a cover 251 having a portion 253 or portions that are at least partially transparent or partially translucent. Another portion 255 or portions of the cover 251 are opaque. The illustrated embodiment of 251 is not intended to be limited in any manner whatsoever. Rather, cover 251 and portions 253, 255 may be configured in an almost infinite number of patterns, shapes, sizes, and colors. In one embodiment, the opaque portion 255 is formed from a material(s) that structurally reinforces the cover 251. Hard disk drive 211 is identical to hard disk drive 111, other than its cover 251.

Figure 3:
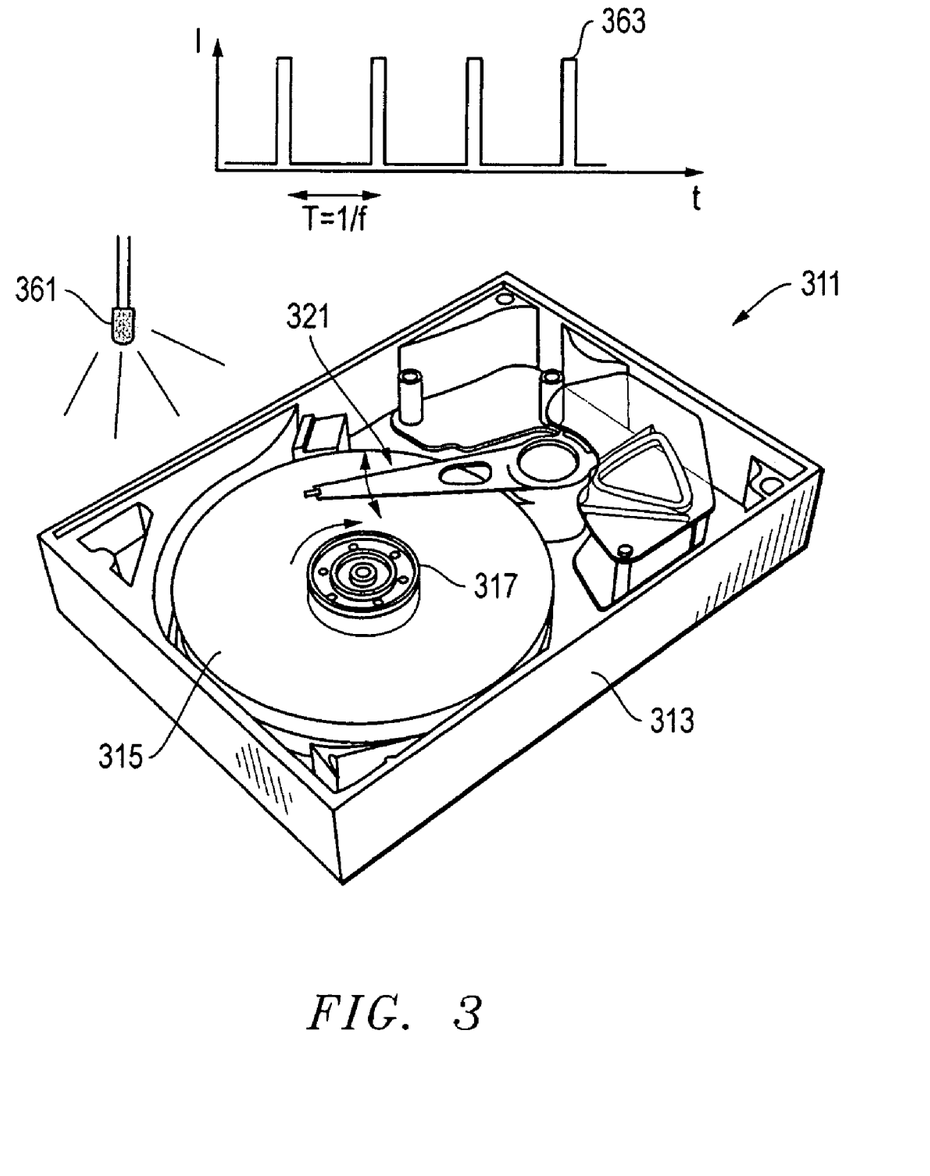
FIG. 3 is an isometric view of yet another embodiment of a hard disk drive shown with the cover removed and is constructed in accordance with the present invention.
Figure 6:
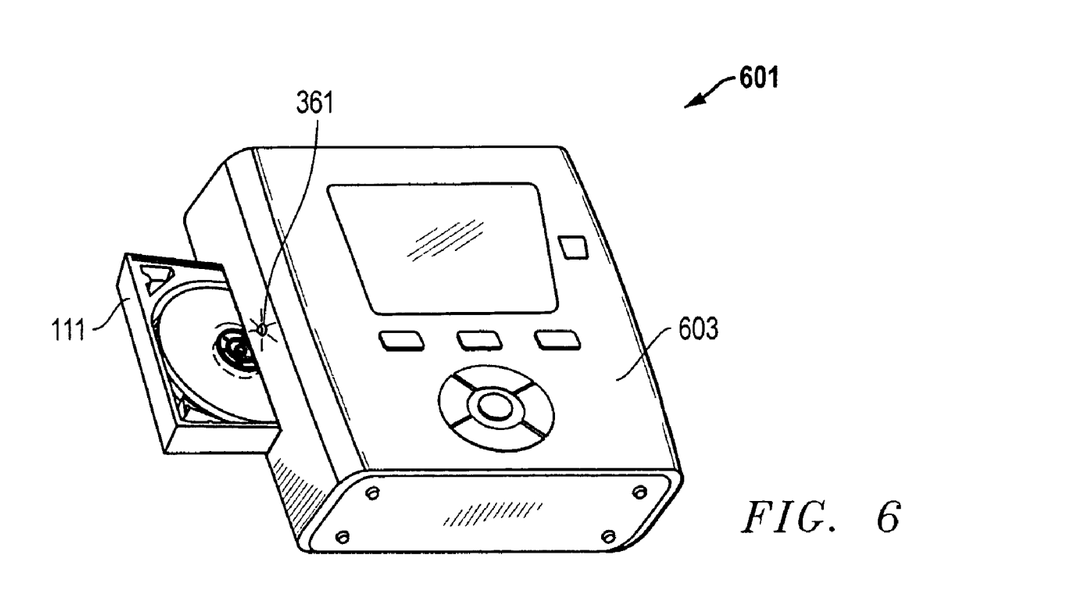
FIG. 6 is an isometric view of an electronic system having an electronic device equipped with a hard disk drive constructed in accordance with the present invention.

Referring now to FIG. 3, a third embodiment of the present invention is shown as hard disk drive 311. In this embodiment, the hard disk drive 311 is not shown with a cover, but is equipped with a cover as described above for the previous embodiments. The further distinguishing feature of this version of the invention is the addition of a flashing device 361. The flashing device 361 may be mounted to the housing 313 or to an electronic device 603 (FIG. 6), for which the hard disk drive (e.g., drives 111, 211, 311) provides data storage and/or retrieval. The flashing device 361 emits pulses of light at regular intervals of time for making movement inside the housing 313 appear to move at a speed that is less than an actual speed of the movement. In one embodiment, the flashing device 361 comprises a stroboscope. Depending on the configuration of the cover for hard disk drive 311, the flashing device 361 can make the disk 315, the hub 317, and/or the actuator 321 appear to move at speeds that are less than their actual speeds. Hard disk drive 311 is otherwise identical to hard disk drives 111, 211.

Figure 4:
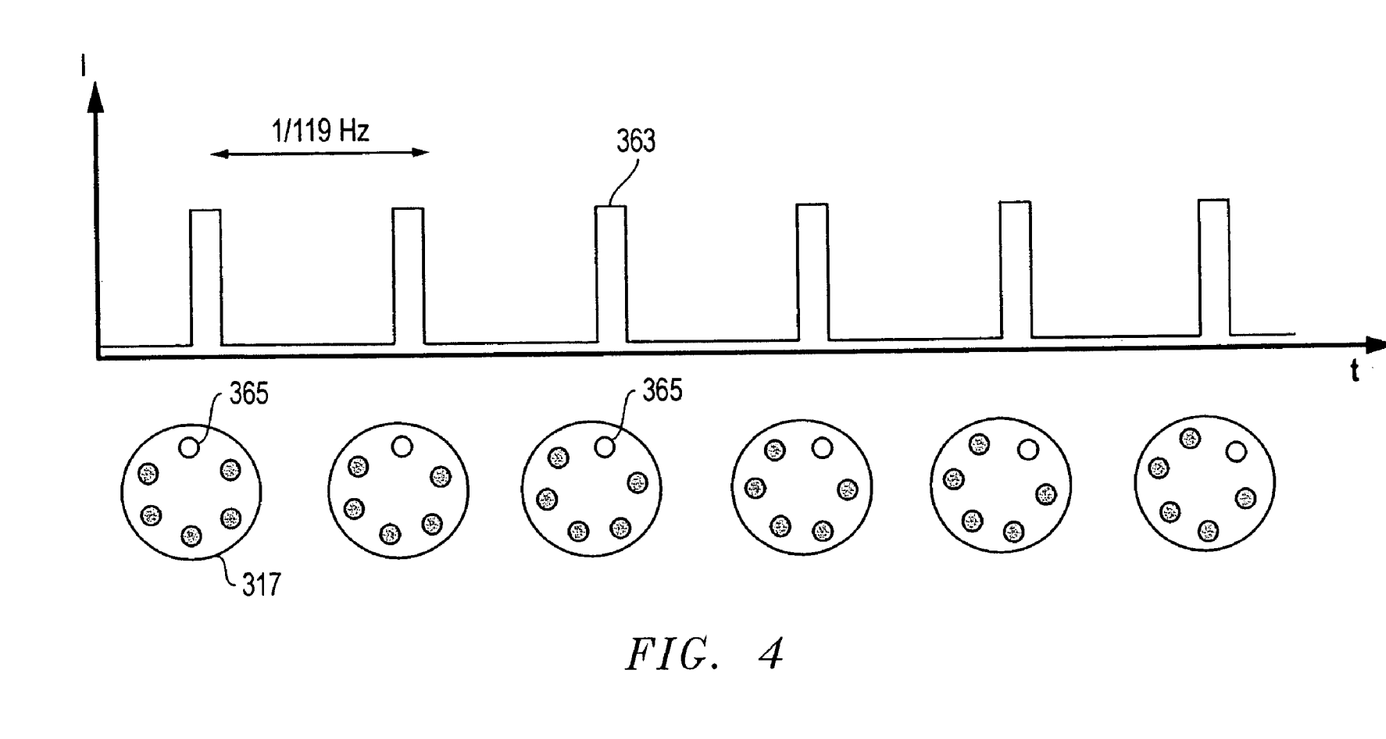
FIG. 4 depicts the incremental effect of a flashing device on the hub of the disk drive of FIG. 3 and is constructed in accordance with the present invention.

As shown in FIG. 4, the flashing device 361 can expose a series of the positions 365 of the hub 317, corresponding to a much smaller apparent rotational velocity. For example, if the frequency of the flashing device 361 is adjusted to be f=[rpm(disk)−rpm(apparent)]/60, then it will appear to the human eye that the rotational velocity of the disks 315 is rpm(apparent)=rpm(disk)−60f. If the disks 315 are spinning 7200 rpm, the flashing device 361 operating at 119 Hz makes the disks 315 appear to be spinning at 7200−119*60=60 rpm, or one rotation per second, which is easily observable by the human eye. It is also possible to intentionally synchronize the flashing device 361 with the movement of the actuator 321 and/or arm to achieve certain visual effects related to the actuator arm. For example, the actuator can be made to appear stationary by intentionally turning on the flashing device always at the same spatial position of the actuator arm. Alternatively, the actuator can be made to appear making certain selected movements.

Figure 5:
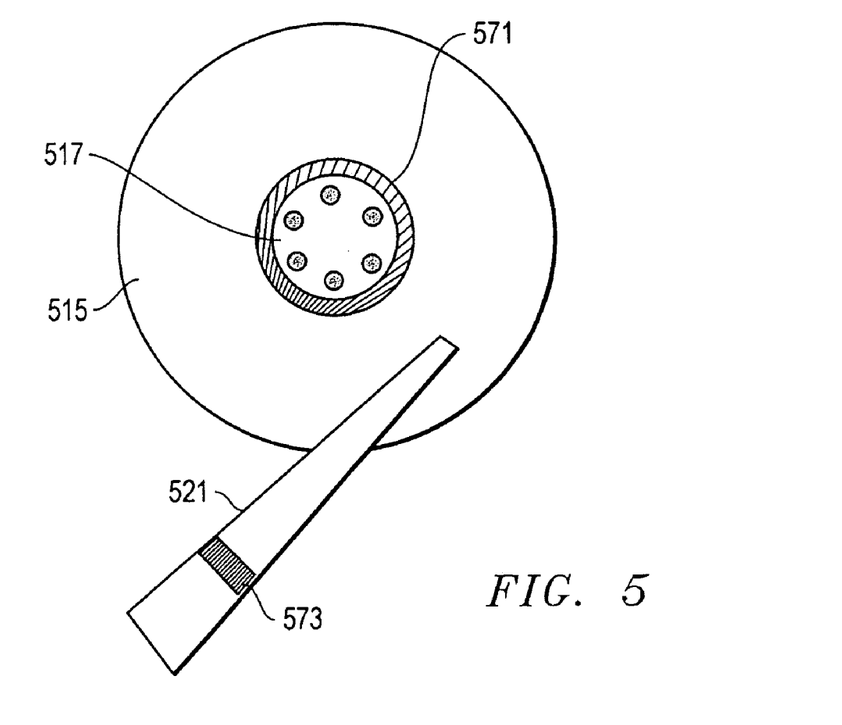
FIG. 5 is a top view of a portion of still another embodiment of a hard disk drive and is constructed in accordance with the present invention.

When the flashing device is turned off or not desirable to enhance the motion and/or appearance of the disk drive, alternative decorations 571, 573 (FIG. 5) on the hub 517, the top disk 515 in the disk stack, the actuator 521, and/or the cover offer additional visual interest. The decorations 571, 573 cause appearance of color, and change and movement of color depending on an angle of observation to additionally contribute to an appearance of the hard disk drive. The decorations 571, 573 may comprise a pattern, such as a diffraction grating pattern, to additionally contribute to an appearance of the hard disk drive.

In operation (FIG. 6), the hard disk drives of the present invention are designed to provide data storage and/or retrieval for an electronic system 601. Along with one or more of the hard disk drives of the present invention, the electronic system 601 may comprise, for example, an electronic device 603, such as a desktop computer of a retrograde-looking design, an MP3 player, a mobile telephone, or a pocket PC, to name a few. The electronic device 603 has a need for a data storage and/or retrieval device during operation. The hard disk drives are mounted to the electronic device 603 such that at least a portion of each of the hard disk drives is observable by a user of the electronic system 601 during operation of the electronic system 601. In this way, the features of the previously described embodiments of the hard disk drives are readily visible to the user of the electronic system 601. Also, the cover of the disk drive may be formed as an integrated part of the cover of the whole machine, such as the electronic device 603.

In addition, the present invention also comprises a method of configuring or making a hard disk drive more visually stimulating, as described above. Again, any of the embodiments of the present invention may be used. The method comprises providing the hard disk drive with a housing, a disk that is rotatable relative to the housing, an actuator that is movable relative to the disk, and a cover that is at least partially transparent. The hard disk drive is mounted to an electronic device 603 (FIG. 6) and providing data storage and/or retrieval for the electronic device 603 with the hard disk drive. As a result, the step of permitting observation of at least some movement inside the housing through the cover while the electronic device is in operation is accomplished.

Alternatively, the method may comprise: permitting observation of the disk and the actuator, providing a completely transparent and clear cover; providing a cover that is tinted with color; providing a translucent cover; and/or structurally reinforcing the cover with opaque materials. The method may further comprise flashing a light on and making the movement inside the housing appear to move at a speed that is less than an actual speed of the movement, and/or flashing a light on and making the disk appear to move at a rotational speed that is less than an actual rotational speed of the disk. The flashing a light step may comprise making the disk, a hub of the disk, and the actuator appear to move at speeds that are less than their actual speeds.

Another alternative of the method includes decorating at least one of the disk, the hub, and the actuator, such that the decorations cause appearance of color, and change and movement of color depending on an angle of observation to additionally contribute to an appearance of the hard disk drive. Still another alternative method further comprises patterning at least one of the disk, a hub of the disk, the actuator, and the cover to additionally contribute to an appearance of the hard disk drive. The patterning step may yet comprise forming a diffraction grating pattern.

The present invention has several advantages, including a transparent cover that allows the elements of the disk drive to be observed while they are in operation. The cover also can be tinted with different colors or made somewhat translucent for further differentiation. In addition, decorations and/or various patterns, such as a diffraction grating pattern, may be placed or formed on the cover, the hub, and/or the actuator to further emphasize particular aspects of the disk drive. A flashing device can also be used to accentuate the rotational motion of the disk and/or hub. In addition, the top hub, top disk surface, and top surface of the actuator arm may be used for marketing purposes, such as advertisement placements, with or without flashing device help.

While the invention has been shown or described in only some of its forms, it should be apparent to those skilled in the art that it is not so limited, but is susceptible to various changes without departing from the scope of the invention. For example, the features of more than one embodiment may be utilized on a single hard disk drive, system, and/or method.

What is claimed is:

1. A method of making a hard disk drive visually observable, comprising;
   (a) providing the hard disk drive with a housing, a disk that is rotatable relative to the housing, an actuator that is movable relative to the disk, and a cover that is at least partially transparent;
   (b) mounting the hard disk drive to an electronic device;
   (c) providing data storage and/or retrieval for the electronic device with the hard disk drive; and
   (d) permitting observation of at least some movement inside the housing through the cover while the electronic device is in operation, and decorating at least one of the disk, the hub, and the actuator, such that the decorations cause appearance of color, and change and movement of color depending on an angle of observation to additionally contribute to an appearance of the hard disk drive.

2. The method of claim 1, wherein step (d) comprises permitting observation of the disk and the actuator.

3. The method of claim 1, wherein step (a) comprises providing a completely transparent and clear cover.

4. The method of claim 1, wherein step (a) comprises providing a cover that is tinted with color.

5. The method of claim 1, wherein step (a) comprises providing a translucent cover.

6. The method of claim 1, wherein step (a) comprises structurally reinforcing the cover with opaque materials.

7. The method of claim 1, further comprising flashing a light on and making the movement inside the housing appear to move at a speed that is less than an actual speed of the movement.

8. The method of claim 1, further comprising flashing a light on and making the disk appear to move at a rotational speed tat is less than an actual rotational speed of the disk.

9. The method of claim 8, wherein the flashing step comprises making the disk, a hub of the disk, and the actuator appear to move at speeds that are less than their actual speeds.

10. The method of claim 1, further comprising patterning at least one of the disk, a hub of the disk, the actuator, and the cover to additionally contribute to an appearance of the hard disk drive.

11. The method of claim 10, wherein the patterning step comprises forming a diffraction grating pattern.

12. A method of making a hard disk drive visually observable, comprising:
  (a) providing the hard disk drive with a housing, a disk that is rotatable relative to the housing, an actuator that is movable relative to the disk, and a cover that is at least partially translucent;
  (b) mounting the hard disk drive to an electronic device;
  (c) providing data storage and/or retrieval for the electronic device with the hard disk drive;
  (d) permitting observation of at least some movement of the disk and the actuator inside the housing through the cover while the electronic device is in operation; and
  (e) flashing a light on and making the movement inside the housing appear to move at a speed that is less than an actual speed of the movement, such that the disk, a hub of the disk, and the actuator appear to move at speeds that are less than their actual speeds.

13. The method of claim 12, wherein step (a) comprises providing a completely transparent and clear cover.

14. The method of claim 12, wherein step (a) comprises providing a cover that is tinted with color.

15. The method of claim 12, wherein step (a) comprises structurally reinforcing the cover with opaque materials.

16. The method of claim 12, further comprising decorating at least one of the disk, the hub, and the actuator, such that the decorations cause appearance of color, and change and movement of color depending on an angle of observation to additionally contribute to an appearance of the hard disk drive.

17. The method of claim 12, further comprising patterning at least one of the disk, a hub of the disk, the actuator, and the cover to additionally contribute to an appearance of the hard disk drive.

18. The method of claim 17, wherein the patterning step comprises forming a diffraction grating pattern.

* * * * *

UNITED STATES PATENT AND TRADEMARK OFFICE
CERTIFICATE OF CORRECTION

| | | |
|---|---|---|
| PATENT NO. | : 7,111,381 B2 | Page 1 of 1 |
| APPLICATION NO. | : 10/668707 | |
| DATED | : September 26, 2006 | |
| INVENTOR(S) | : Zvonimir Z. Bandie and Thomas Robert Berthold | |

It is certified that error appears in the above-identified patent and that said Letters Patent is hereby corrected as shown below:

Col. 7, Line 20: replace "tat" with --that--

Signed and Sealed this

Nineteenth Day of December, 2006

JON W. DUDAS
*Director of the United States Patent and Trademark Office*